April 6, 1926.

A. FERRETTI

MILKING BUCKET

Filed Jan. 19, 1926

1,579,811

INVENTOR
ANTONIO FERRETTI.
BY Arthur L. Slee.
ATTY.

Patented Apr. 6, 1926.

1,579,811

UNITED STATES PATENT OFFICE.

ANTONIO FERRETTI, OF SAN FRANCISCO, CALIFORNIA, ASSIGNOR OF ONE-HALF TO THOMAS LACONI, OF SAN FRANCISCO, CALIFORNIA.

MILKING BUCKET.

Application filed January 19, 1926. Serial No. 82,279.

*To all whom it may concern:*

Be it known that I, ANTONIO FERRETTI, a subject of the Kingdom of Italy, residing in the city and county of San Francisco, and State of California, have invented a new and useful Improvement in a Milking Bucket, of which the following is a specification.

My invention relates to improvements in milking buckets wherein projecting supports, arranged to engage the knees of a milker supporting the milking bucket during the process of milking, operate in conjunction with means for adjusting said supports longitudinally of said bucket whereby the elevation of said bucket may be adjusted relatively to the knees of the milker.

In the process of milking cows one milker may be taller than another and consequently the milking bucket may not be held as closely to the cow being milked by a short milker.

The present invention has for its principal object to provide improved supports for milking buckets, which may engage and rest upon the knees of the milker, and which may be adjusted longitudinally of said bucket to raise or lower the same to adjust the elevation of said bucket relatively to the knees of the milker or to the cow.

Another object is to provide improved supports for milking buckets which will relieve the strain of constantly pressing the knees of the milker to the sides of the milking bucket to hold the same by frictional pressure.

Another object is to provide a pair of new and improved diametrically opposed supports for milking buckets which may be adjusted simultaneously.

I accomplish these and other objects by means of the improved device disclosed in the drawings forming a part of the present specification wherein like characters of reference are used to designate similar parts throughout the said specification and drawings, and in which—

Figure 1:
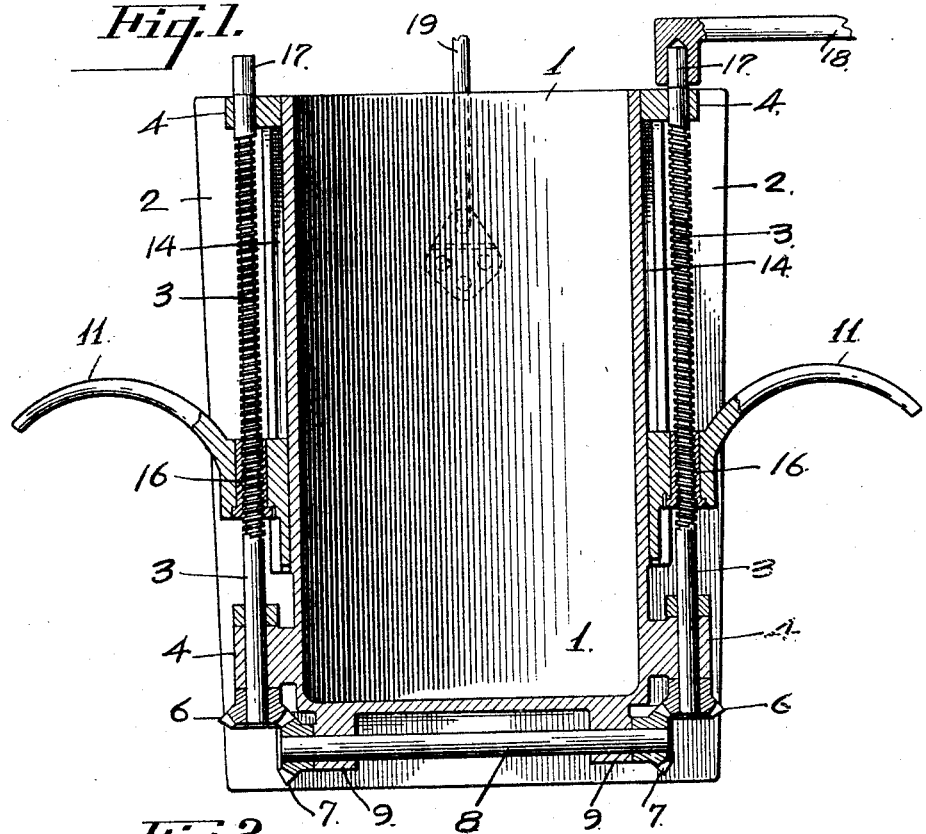
Fig. 1 is a vertical sectional view of my improved milking bucket.
Figure 2:
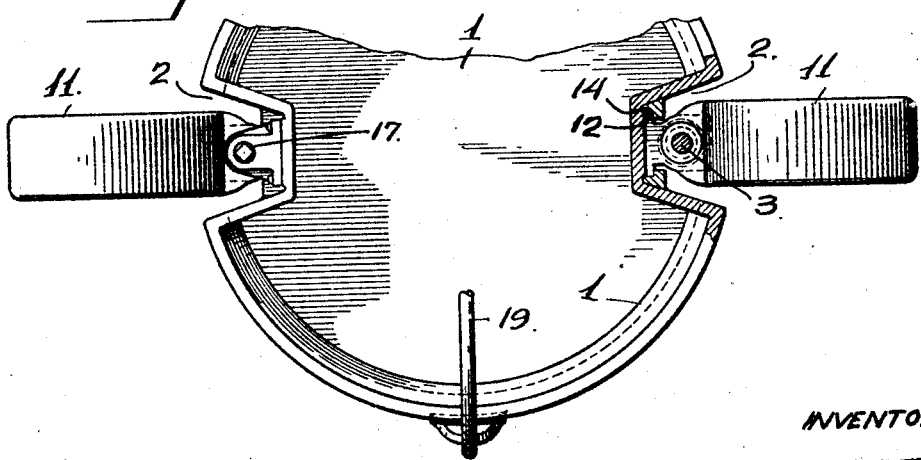
Fig. 2 is a broken plan view, partly in section.

Referring to the drawings the numeral 1 is used to designate in general a milking bucket having longitudinally disposed recesses 2 positioned on diametrically opposed outer sides thereof, within which longitudinal recesses 2 are rotatably mounted oppositely threaded rods 3 by means of suitable upper and lower bearings 4, the lower end of each threaded rod being provided with bevel or miter gears 6 which mesh with similar gears 7 on opposite ends of a horizontally disposed connecting shaft or rod 8 in turn rotatably mounted within suitable bearings 9 formed integrally with the bottom of the bucket 1, so that by means of said bevel gears 6 and 7 and connecting shaft 8 the threaded rods 3 may be rotated in opposite directions simultaneously, the purpose of which will hereinafter be more fully set forth.

A pair of projecting arcuate supports 11 project outwardly from diametrically opposed sides of the bucket 1 by being slidably mounted one within each recess 2, each support 11 being provided with runners 12 which engage suitable grooves 14 formed within the corners of each recess 2, as disclosed in the drawings. These arcuate supports 11 are screw-threaded upon their respective rods 3 as at 16 whereby said supports may be simultaneously moved longitudinally of the bucket, that is, up or down, when the threaded rods 3 are rotated.

The supports 11 are formed arcuate in order to facilitate the engagement of the same with the knees of a milker, not shown, whereby said bucket 1 may be effectively supported under the cow being milked by said knees of said milker. The upper ends of the threaded rods are squared as at 17 in order to receive the usual handle or crank 18 which may thereby detachably engage either rod 3 and rotate the same.

A suitable bail 19 provides a means by which the bucket may be transported when not being used for milking.

In the present practice the milker seats himself in the usual manner, adjacent the cow to be milked, and grasps and supports the present type of milking bucket between his knees and maintains said bucket in such position during the entire period of milking by frictional pressure of said knees against the sides of the milking bucket.

In operation, in the present invention, the milker supports the bucket by resting the arcuate supports 11 upon his knees, thereby relieving the strain on the lower limbs and more effectively supporting said bucket for the reason that said bucket cannot slip downwardly as the weight of the bucket increases by reason of the constantly increasing supply of milk being deposited therein. Should the knees of the milker be too low or the cow too high, or vice versa, the elevation of the bucket to the required or desired elevation may be easily and readily accomplished by rotating the threaded rods 3 by means of the handle or crank 18, until the proper elevation of said bucket is attained.

As the arcuate supports 11 are screw-threaded upon said rods 3 it is obvious that they are normally held against longitudinal movement, thereby preventing movement of said bucket when supported by said arcuate supports 11, until said arcuate supports are purposely moved in either direction by rotation of the threaded rods 3.

It is also obvious that, if desired, the said arcuate supports may be used as handles in transporting the bucket 1.

Having thus described my invention what I claim as new and desire to secure by Letters Patent is:

1. The combination with a milking bucket of supports slidably mounted upon diametrically opposed sides of said bucket and arranged to rest upon the knees of a milker; and means for moving the said supports longitudinally of said bucket whereby the same may be adjusted to various elevations on the knees of said milker.

2. The combination with a milking bucket of arcuate supports slidably mounted upon diametrically opposed sides of said bucket and arranged to rest upon the knees of a milker; and means for moving both arcuate supports longitudinally of said bucket simultaneously whereby the elevation of said bucket may be adjusted.

3. The combination with a milking bucket having longitudinally disposed recesses in diametrically opposed sides thereof, of a pair of arcuate supports slidably mounted within said recesses with the arcuate portions thereof projecting beyond said recesses to engage the knees of a milker; and means for moving said supports longitudinally within said recesses simultaneously whereby the elevation of said bucket may be adjusted.

4. The combination with a milking bucket of a pair of arcuate supports slidably mounted upon said bucket and projecting from the sides thereof to engage the knees of a milker; a pair of rods rotatably mounted upon the bucket and screw threaded to said arcuate supports whereby said supports may be moved longitudinally of said bucket to adjust the elevation thereof on the knees of a milker; and means for moving said rods simultaneously whereby both supports may be constantly maintained at the same position on said bucket.

5. The combination with a milking bucket of a pair of threaded rods rotatably mounted upon diametrically opposed sides of said bucket; a pair of arcuate supports screw threaded upon said rods and projecting from the sides of said bucket to engage the knees of a milker; means for preventing rotation of said supports when the rods are rotated whereby said supports may be moved longitudinally upon said bucket when said rods are rotated; and means for rotating both rods simultaneously.

6. The combination with a milking bucket having diametrically opposed longitudinal recesses formed in the outer surface thereof, of a pair of oppositely threaded rods rotatably mounted within said recesses; a pair of arcuate supports slidably mounted upon said bucket within said recesses and screw threaded upon said rods, and projecting from the sides of said bucket to engage the knees of a milker; and means for rotating one rod when the other is rotated whereby said supports may be moved longitudinally of said bucket simultaneously to adjust the elevation of said bucket when supported by said supports.

7. The combination with a milking bucket of supports projecting from diametrically opposed sides of said bucket; and means operatively connected to said supports for normally preventing movement thereof and for simultaneously moving said supports longitudinally on said bucket whereby the elevation of the same may be adjusted.

In witness whereof I hereunto set my signature.

ANTONIO FERRETTI.